UNITED STATES PATENT OFFICE.

CARLETON ELLIS, OF MONTCLAIR, NEW JERSEY.

PROCESS OF REGENERATING CATALYTIC MATERIAL.

1,390,684.  Specification of Letters Patent.  Patented Sept. 13, 1921.

No Drawing. Original application filed November 24, 1916, Serial No. 133,252. Divided and this application filed May 1, 1917. Serial No. 165,763.

*To all whom it may concern:*

Be it known that I, CARLETON ELLIS, a citizen of the United States, residing at Montclair, in the county of Essex and State of New Jersey, have invented certain new and useful Improvements in Processes of Regenerating Catalytic Material, of which the following is a specification.

The present invention relates to the regeneration of a catalyst used in hydrogenating, and particularly adapted for the hydrogenation of oils containing unsaturated components and other unsaturated organic materials, by the decomposition of salts of catalytic metals with formic or other lower fatty acids, while carried in oil or other organic vehicle, solely by heating, or by heating with the simultaneous introduction of an inert or non-reducing gas, such as nitrogen and in some cases carbon dioxid, and the like. Hydrogen or gases containing hydrogen, such as water gas, or gases containing carbon monoxid, such as water gas or producer gas are to be avoided, these materials being reducing agents and not inert gases. In my prior applications 656,100 filed October 23, 1910 (now Patent 1,026,156), 686,988 filed March 29, 1912 (now Patent 1,217,118), 808,461 filed December 23, 1913, 817,041 filed February 26, 1914 (now Patent 1,251,202), 50,492 filed September 13, 1915, 89,093 filed April 5, 1916 and others, I have described the production of catalysts by the treatment of certain reducible compounds of nickel and certain other catalytic metals, *e. g.* oleates of nickel and of other like metals, in a bath of oil, for example by treatment with a reducing gas such as hydrogen. The present application is for matter constituting a continuation or an improvement in the processes of the foregoing applications and is a division of my copending application 133,252, wherein the treatment of nickel and similar oleates is specifically claimed.

Various gases and volatile bodies are liberated during the decomposition of some metallo-organic compounds, which tend to retard the reaction, particularly if allowed to remain confined within the material, and these gases also appear to have some action on the catalyst itself, particularly if the said gases are allowed to accumulate in the mixture undergoing reaction, to a considerable extent.

In accordance with the present process, I preferably employ a partial vacuum during the heating operation, and also I preferably, although not necessarily, introduce into the oily material, below the surface thereof, an inert gas as above specified, the action of this inert gas and of the partial vacuum being to keep the reaction mixture substantially free from the volatile decomposition products of the metallo-organic compound under treatment, which action tends to prevent deleterious modification of the texture of the catalyst or coagulation thereof while the same is being produced.

As examples of the particular materials to be decomposed, I mention nickel formate, copper formate, or the double acetates (*e. g.* nickel-copper acetate) or double formates (*e. g.*, nickel-copper formate) or mixture of two or more of the above-mentioned bodies.

I call attention to the fact that it is not necessary to restrict the amount of the metal compound to an amount capable of furnishing the quantity of catalytic metal sufficient for the catalytic hydrogenation of the oil under treatment, but in some cases I preferably employ a considerable excess of the salt of the catalytic metal, in order to produce a catalyzer concentrate, which may be added to a relatively large amount of oil, prior to hydrogenation of said oil. Thus for example, I may employ a mixture of an oil carrying 12 to 25% of one of the metallo-organic compounds to be employed, such as those above referred to, or of a mixture of such compounds.

The temperature to which the oil and metallo-organic body will be heated will depend upon the nature of the particular metallo-organic material, and to a certain extent upon the character of the oily vehicle. Upon the particular temperature used will depend to some extent, the character of the product. When using nickel formate and cottonseed oil, a vacuum of 29—30 inches of mercury and a temperature of about 200° C. for several hours may be used. Somewhat higher temperatures are, however, preferred in carrying out the process. When heating this mixture, I preferably bubble nitrogen gas (essentially free from oxygen and CO, although a small amount of $CO_2$ usually is not disadvantageous) slowly therethrough, the partial vacuum above referred to preferably being maintained.

The use of decomposing temperatures ranging between 230° and 250°C, or thereabout, for organic salts of this character forms a part of the present invention. The catalyzer thereby formed is somewhat better than the catalyzer produced at 200° C. The reduction of, for example, nickel formate, at a temperature below but near 200° C, when carried out under reduced atmospheric pressure does not afford a very efficient catalyzer. The simple heating of the formate or analogous salt of a fatty acid in an open vessel especially with a current of an inert gas passing through the oil while heating to temperatures approximately between 230 and 250° C., enables catalytic material of a highly effective character and satisfactory texture to be simply and cheaply prepared without resorting to expensive and elaborate apparatus or to use a series of costly steps to produce catalytic material adapted for the hydrogenation of oils. Catalyzer may be prepared in accordance with my invention, which has good filtering qualities.

In heating up a metallo-organic compound of the character described, including a mixture of several formates, or other salts of the lower fatty acids, the temperature is raised to at least the decomposition point and preferably is held at least 10° or so above such decomposition point and the catalyzer prepared in this manner is suitably collected, or the reduction may be caused to take place in a suitable oily vehicle to produce the catalyzer concentrate which may be suitably diluted with the oil to be hydrogenated to give approximately one half of one per cent. or thereabout of the catalytic material. Hydrogen is then introduced while the oil is maintained at 160–190° C. until hydrogenated to the desired extent.

By heating such nickel or other compound to at least the decomposition point or preferably 10° higher as stated, and in passing through the oily vehicle a current of an inert gas the removal of deleterious gases and products of reaction of a volatile character is effected so that these gases or volatile decomposition products are not allowed to act upon the catalyzer which is forming or has been formed and thus the catalytic material is preserved in a state of purity which is highly desirable, and extensive action on the oil is also prevented.

The oil employed may be a fatty or mineral oil, and obviously should be sufficiently free of catalyzer poisons or of materials capable of exerting any untoward action on the catalyst, which is especially sensitive to injury while in a nascent state. All detrimental traces of sulfur, chlorin, (sometimes free oxygen) and the like should accordingly be first removed from the oil if present therein, preferably before adding the metallo-organic body thereto.

For most purposes it is advisable to conduct the decomposition reaction in a body of oil of the same kind and quality (or a similar kind or quality) as the oil with which the catalytic material is to be employed.

It will be obvious that the oily material which forms the reaction vehicle will also form the sealing fluid or medium for the produced catalyst. If this oil be one which is solid or semi-solid at normal atmospheric pressures, the product may be run into receptacles or molds and allowed to harden, after the reaction is completed. The "castings" thereby produced may be stored for subsequent use as catalyst material, may be shipped, etc., to plants where the same is to be used, and since the solidified oil forms a seal, the catalyst is protected thereby from the action of air and other deleterious influences. It is advisable, however, to suitably seal up such packages, directly or shortly after the production thereof.

I call attention to the fact that this invention is not restricted to salts of the acids mentioned, or to salts of the metals stated. Salts of various organic acids are suitable, (especially the salts of the lower fatty acids) in addition to the formates specifically described, and salts of any acid, which when heated will decompose and liberate free metal, may be employed. Formates and similar salts of metals other than copper and nickel, notably the salts of the metals having atomic weights between 56 and 64, are suitable for use in my present invention.

The metals may be set free in a non-settling condition of fineness, in which condition they are especially suited for use as catalysts in hydrogenation of oils and other organic bodies, and for other purposes.

A distinct advantage is found to result in the use of a partial vacuum and the absence of introduction of reducing gases, in that such gases, present while the catalyst is being produced (while in a nascent state) and particularly if under high pressures, appear to alter the physical structure of the metal to make it more dense and less catalytically active, or otherwise of not the best possible character, as for example, becoming coagulated and ineffective after use for a short time. The unfavorable properties in question appear, in at least some instances, to be produced by the continued presence, in the reaction mixture, of the non-metallic reaction products, such as water, carbon monoxid, hydrogen, formic acid and other acids, etc. By the use of vacuum, and by passing a current of inert gas through the reaction mass, these products are rapidly carried away, and out of contact with the nascent metal being formed or at least it reduces the amount of such products present with the said nascent metal, As above stated, the metal produced in the preferred form of this process is in an extremely attenuated and finely divided state, highly conducive to catalytic activity. It may be repeatedly used without danger of coagulation, over a considerable period.

Without limiting myself to particular metals, I will state that the process of the present application is highly effective in the production of the catalytic metals having an atomic weight between 56 and 64.

The metallo-organic salts employed herein may be prepared in various ways. Nickel formate may be prepared by dissolving nickel carbonate or hydrate in formic acid. The freshly precipitated carbonate or hydrate is more effective in yielding a salt of the character desired. Acid, basic and neutral compounds of formic acid may be produced, the preferable one being the neutral formate. The salts preferably should be prepared in a substantially pure condition, as by using chemicals free from catalyzer poisons, etc., or by effective washing of the product when feasible, so as to free it from any catalyzer poisons that may be present in prejudicial amount. In a similar manner the acetate and corresponding salts of analogous aliphatic or fatty acids may be prepared from basic nickel carbonate or hydrate in a freshly precipitated state.

The temperature employed in the process, as above stated, may vary more or less. While using hydrogen gas, or other reducing gas, as in the processes in my other cases above referred to, temperatures below 200° C., particularly temperatures from 160 or 180 to 200° C. may be used. Without using hydrogen, the best temperature for the decomposition of nickel formate appears to lie in the neighborhood of 230 to 240° C. At these temperatures very finely divided nickel, in a substantially colloidal condition, and possessing strong magnetic properties, is obtained.

It appears probable that with some of the metallo-organic compounds mentioned, while no reducing gas is added or brought into the solution or mixture from outside, the decomposition of a portion of the organic acid, within the body of oil, for example occurring substantially simultaneously with the decomposition of the metallo-organic compound, or else while the said organic acid set free is in the nascent condition, some reducing gases may be formed. In some of the appended claims, I have used the expression "in the absence of added reducing gases," which expression is not intended to imply that such reducing gases as are formed in the process itself may not have the same reducing action upon the metallo-organic compound. It even appears as being possible that a part of the reduction of the nickel compounds is effected in a zone of gases of reducing character, produced by self-decomposition of the metallo-organic compounds.

The regeneration of the catalytic material is preferably carried out by dissolving the spent catalyzer, preferably previously extracted with benzol to remove fats, etc., in nitric acid and precipitating with sodium carbonate or caustic soda solution to yield a moist carbonate or hydrate and then reacting upon this moist precipitate with formic acid or acetic acid and the like. It is not necessary in all cases to act upon the wet precipitate. Freshly precipitated nickel hydrate may be dried but in such case it is desirable to carry out the drying so as to not contract the nickel hydrate particles as to interfere with their ready solution in the acid solvents.

The salt thereby produced will thereafter be decomposed in the manner above described.

What I claim is:

1. The process of regenerating catalytic nickel material which comprises freeing the catalytic material to a large extent from fatty or oily material, dissolving the residue in nitric acid, precipitating the nickel from the nickel solution as a basic compound, in reacting upon the basic material in the freshly precipitated condition with formic acid, whereby a nickel formate is obtained and in subsequently decomposing such salt by heating to a temperature at or above the decomposition point.

2. The process of regenerating catalytic nickel material used in the hydrogenation of oils which comprises freeing the catalytic material to a large extent from fatty or oily material, dissolving the residue in an acid, precipitating the nickel from the nickel solution as a basic compound, in reacting upon the basic material in the freshly precipitated condition with a fatty acid to produce a salt of the fatty acid and in subsequently decomposing such salt by heating to a temperature at or above the decomposition point, in a bath of oily material.

In testimony whereof I affix my signature.

CARLETON ELLIS.